United States Patent
Harris et al.

(10) Patent No.: US 11,506,136 B1
(45) Date of Patent: Nov. 22, 2022

(54) SELECTIVE CATALYTIC REDUCTION CATALYST PRE-HEATING AND EXHAUST BURNER AIR CONTROL

(71) Applicant: Tenneco Automotive Operating Company Inc., Lake Forest, IL (US)

(72) Inventors: Thomas M. Harris, Jackson, MI (US); Matthew Muhleck, Dansville, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 17/382,885

(22) Filed: Jul. 22, 2021

(51) Int. Cl.
*F02D 41/02* (2006.01)
*F01N 3/20* (2006.01)
*F02D 41/06* (2006.01)
*F01N 3/32* (2006.01)

(52) U.S. Cl.
CPC ......... *F02D 41/024* (2013.01); *F01N 3/2033* (2013.01); *F01N 3/2066* (2013.01); *F01N 3/32* (2013.01); *F02D 41/062* (2013.01); *F01N 2610/11* (2013.01)

(58) Field of Classification Search
CPC ........ F01N 3/2066; F01N 3/2033; F01N 3/32; F01N 2610/11; F02D 41/024; F02D 41/062
See application file for complete search history.

(56) References Cited

U.S. PATENT DOCUMENTS

| | | | |
|---|---|---|---|
| 4,520,624 A | 6/1985 | Kiyota et al. | |
| 4,538,411 A | 9/1985 | Wade et al. | |
| 4,651,524 A | 3/1987 | Brighton | |
| 5,253,475 A | 10/1993 | Kabasin | |
| 5,320,523 A | 6/1994 | Stark | |
| 5,339,630 A | 8/1994 | Pettit | |
| 5,493,858 A | 2/1996 | Hosoya et al. | |
| 5,517,848 A | 5/1996 | Hosoya et al. | |
| 5,519,992 A | 5/1996 | Hosoya et al. | |
| 8,001,773 B2 | 8/2011 | Winter et al. | |
| 9,765,662 B2 | 9/2017 | Tsumagari et al. | |
| 10,738,676 B2 | 8/2020 | Parrish | |

(Continued)

FOREIGN PATENT DOCUMENTS

| | | |
|---|---|---|
| DE | 4120702 A1 | 12/1992 |
| DE | 4416014 A1 | 11/1995 |

(Continued)

*Primary Examiner* — Phutthiwat Wongwian
*Assistant Examiner* — Diem T Tran
(74) *Attorney, Agent, or Firm* — Harness, Dickey & Pierce, P.L.C.

(57) ABSTRACT

An exhaust control system of a vehicle includes a fuel injector configured to inject fuel into a combustion chamber of a burner of an exhaust system upstream of a selective catalytic reduction (SCR) catalyst; an air pump configured to pump air into the combustion chamber of the burner; a spark plug configured to ignite an air/fuel mixture within the combustion chamber of the burner; a fuel control module configured to, while an engine is off before an engine startup, selectively actuate the fuel injector and begin fuel injection; a pump control module configured to, while the engine is off before the engine startup, selectively turn on the air pump; and a spark control module configured to, while the engine is off and before the engine startup, selectively apply power to the spark plug and begin providing spark.

19 Claims, 5 Drawing Sheets

(56) References Cited

U.S. PATENT DOCUMENTS

| | | | |
|---|---|---|---|
| 2007/0199310 A1 | 8/2007 | Eybergen et al. | |
| 2010/0154745 A1* | 6/2010 | Gaiser | F23D 11/24 123/446 |
| 2017/0350294 A1* | 12/2017 | Asaura | F01N 9/00 |
| 2020/0102874 A1* | 4/2020 | Kurtz | F02D 29/02 |
| 2020/0102925 A1* | 4/2020 | Christi | B60W 10/02 |

FOREIGN PATENT DOCUMENTS

| | | | |
|---|---|---|---|
| DE | 102010013011 | * | 9/2011 |
| DE | 102010013011 A1 | | 9/2011 |
| DE | 102019008956 A1 | | 7/2020 |
| EP | 0813648 B1 | | 9/1998 |
| JP | 6266216 B2 | | 1/2018 |
| JP | 6385704 B2 | | 9/2018 |
| JP | 2018145837 A | | 9/2018 |
| KR | 20120077172 A | | 7/2012 |

* cited by examiner

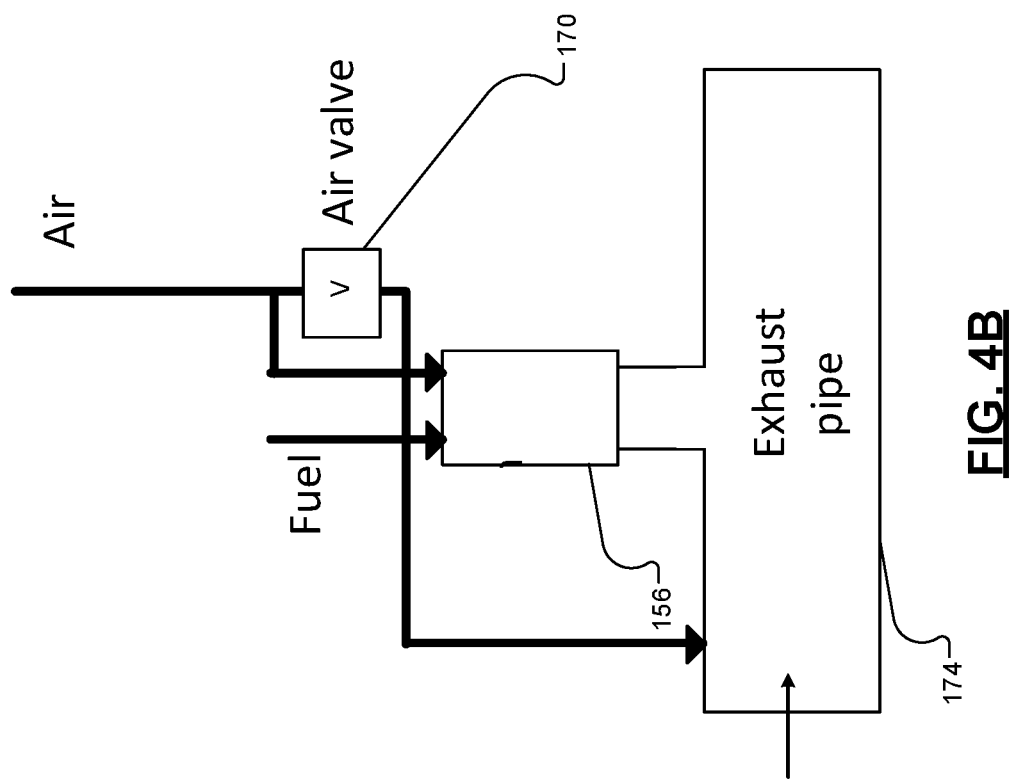

US 11,506,136 B1

SELECTIVE CATALYTIC REDUCTION CATALYST PRE-HEATING AND EXHAUST BURNER AIR CONTROL

FIELD

The present disclosure relates to exhaust control systems and methods and more particularly to systems and methods for controlling selective reduction catalyst (SCR) temperature and airflow into an exhaust system.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Air is drawn into an engine through an intake manifold. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust from an engine combusting diesel fuel with an excess of air may include particulate matter (PM) and gas. The exhaust gas includes nitrogen oxides (NOx), such as nitrogen oxide (NO) and nitrogen dioxide ($NO_2$). An exhaust treatment system may be used to reduce the amount of NOx and PM in the exhaust.

The exhaust treatment system may include a diesel oxidation catalyst (DOC). The DOC removes hydrocarbons and/or carbon oxides from the exhaust.

The exhaust treatment system may also include a diesel particulate filter (DPF), which removes particulate matter (PM) from the exhaust. The exhaust treatment system may also include a selective catalytic reduction (SCR) catalyst. A diesel exhaust fluid (DEF) injector injects a DEF (e.g., a urea-water solution) into the decomposition tube or reactor, located upstream of the SCR catalyst. When the DEF encounters hot exhaust in the decomposition tube, the water portion undergoes evaporation and the urea undergoes decomposition to form ammonia. The ammonia ($NH_3$) provided by the DEF is adsorbed by the SCR catalyst. When ammonia is present on the surface of the SCR catalyst, and the catalyst is hot, NOx in the exhaust will react with the ammonia to form nitrogen ($N_2$). In this way the amount of NOx emitted by the engine is reduced.

The SCR catalyst may only be effective at reacting with NOx at elevated exhaust temperatures. Exhaust temperatures at engine startup are generally low, such that unacceptable levels of NOx may be emitted from a vehicle.

A need exists to warm the SCR catalyst before engine startup occurs. Warming the SCR catalyst before engine startup may position the SCR catalyst to begin reacting with NOx sooner after engine startup. A need also exists to maximize a lifetime of burners that can be used to warm the SCR catalyst.

SUMMARY

In a feature, an exhaust control system of a vehicle includes: a fuel injector configured to inject fuel into a combustion chamber of a burner of an exhaust system upstream of a selective catalytic reduction (SCR) catalyst; an air pump configured to pump air into the combustion chamber of the burner; a spark plug configured to ignite an air/fuel mixture within the combustion chamber of the burner; a fuel control module configured to, while an engine is off before an engine startup, selectively actuate the fuel injector and begin fuel injection; a pump control module configured to, while the engine is off before the engine startup, selectively turn on the air pump; and a spark control module configured to, while the engine is off and before the engine startup, selectively apply power to the spark plug and begin providing spark.

In further features, a startup module configured to selectively generate an engine startup signal before the engine startup, where: the fuel control module is configured to, while the engine is off before the engine startup, actuate the fuel injector and begin fuel injection in response to the generation of the engine startup signal; the pump control module is configured to, while the engine is off before the engine startup, turn on the air pump in response to the generation of the engine startup signal; and the spark control module configured to, while the engine is off and before the engine startup, apply power to the spark plug and begin providing spark in response to the generation of the engine startup signal.

In further features, the startup module is configured to generate the engine startup signal in response to a determination that a distance between a mobile device and the vehicle transitioned from (a) greater than a predetermined distance to (b) less than the predetermined distance.

In further features, a wireless transceiver module is configured to: wirelessly communicate with the mobile device; and determine the distance between the mobile device and the vehicle based on signals received from the mobile device.

In further features, the startup module is configured to generate the engine startup signal in response to unlocking of one or more doors of the vehicle.

In further features, the mobile device is a key fob.

In further features, the startup module is configured to selectively generate the engine startup signal based on a present time.

In further features, the startup module is configured to generate the engine startup signal in response to a determination that a predetermined period passed after a user exited the vehicle.

In further features: a diesel emissions fluid (DEF) injector is configured to inject a DEF into the exhaust system upstream of the selective catalytic reduction (SCR) catalyst; and a DEF control module is configured to, while the engine is off before the engine startup, selectively actuate the DEF injector and begin DEF injection.

In further features, the DEF control module is configured to, while the engine is off before the engine startup, selectively actuate the DEF injector and begin DEF injection in response to a determination that a temperature of the SCR catalyst is greater than a predetermined temperature.

In further features, the DEF control module is configured to, while the engine is off before the engine startup, not actuate the DEF injector and not perform DEF injection when the temperature of the SCR catalyst is less than the predetermined temperature.

In further features, an air valve receives air from the air pump and is configured to, when open, output air to a second location that is different than the combustion chamber of the burner.

In further features, a flame sheath includes: an inner surface that defines the combustion chamber; and an outer surface, where the second location is adjacent to the outer surface of the flame sheath.

In further features, the second location is downstream of the combustion chamber.

In a feature, an exhaust control method for a vehicle incudes: by a fuel injector, selectively injecting fuel into a combustion chamber of a burner of an exhaust system upstream of a selective catalytic reduction (SCR) catalyst; by an air pump, selectively pumping air into the combustion chamber of the burner; by a spark plug, selectively igniting an air/fuel mixture within the combustion chamber of the burner; while an engine is off before an engine startup: actuating the fuel injector and beginning fuel injection; turning on the air pump; and applying power to the spark plug and beginning to provide spark.

In further features, the exhaust control method further includes a selectively generating an engine startup signal before the engine startup, where: the actuating the fuel injector and beginning fuel injection includes actuating the fuel injector and beginning fuel injection in response to the generation of the engine startup signal; the turning on the air pump includes turning on the air pump in response to the generation of the engine startup signal; and the applying power to the spark plug and beginning to provide spark includes applying power to the spark plug and beginning to provide spark in response to the generation of the engine startup signal.

In further features, the selectively generating the engine startup signal before the engine startup includes generating the engine startup signal in response to a determination that a distance between a mobile device and the vehicle transitioned from (a) greater than a predetermined distance to (b) less than the predetermined distance.

In further features, the exhaust control method further includes: wirelessly communicating with the mobile device; and determining the distance between the mobile device and the vehicle based on signals received from the mobile device.

In further features, the selectively generating the engine startup signal before the engine startup includes generating the engine startup signal in response to unlocking of one or more doors of the vehicle.

In further features, the selectively generating the engine startup signal before the engine startup includes generating the engine startup signal at least one of: based on a present time; and in response to a determination that a predetermined period passed after a user exited the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3, 4A, and 4B are functional block diagrams of example air valve connections.

In the drawings, reference numbers may be reused to identify similar and/or identical elements.

DETAILED DESCRIPTION

Figure 1:
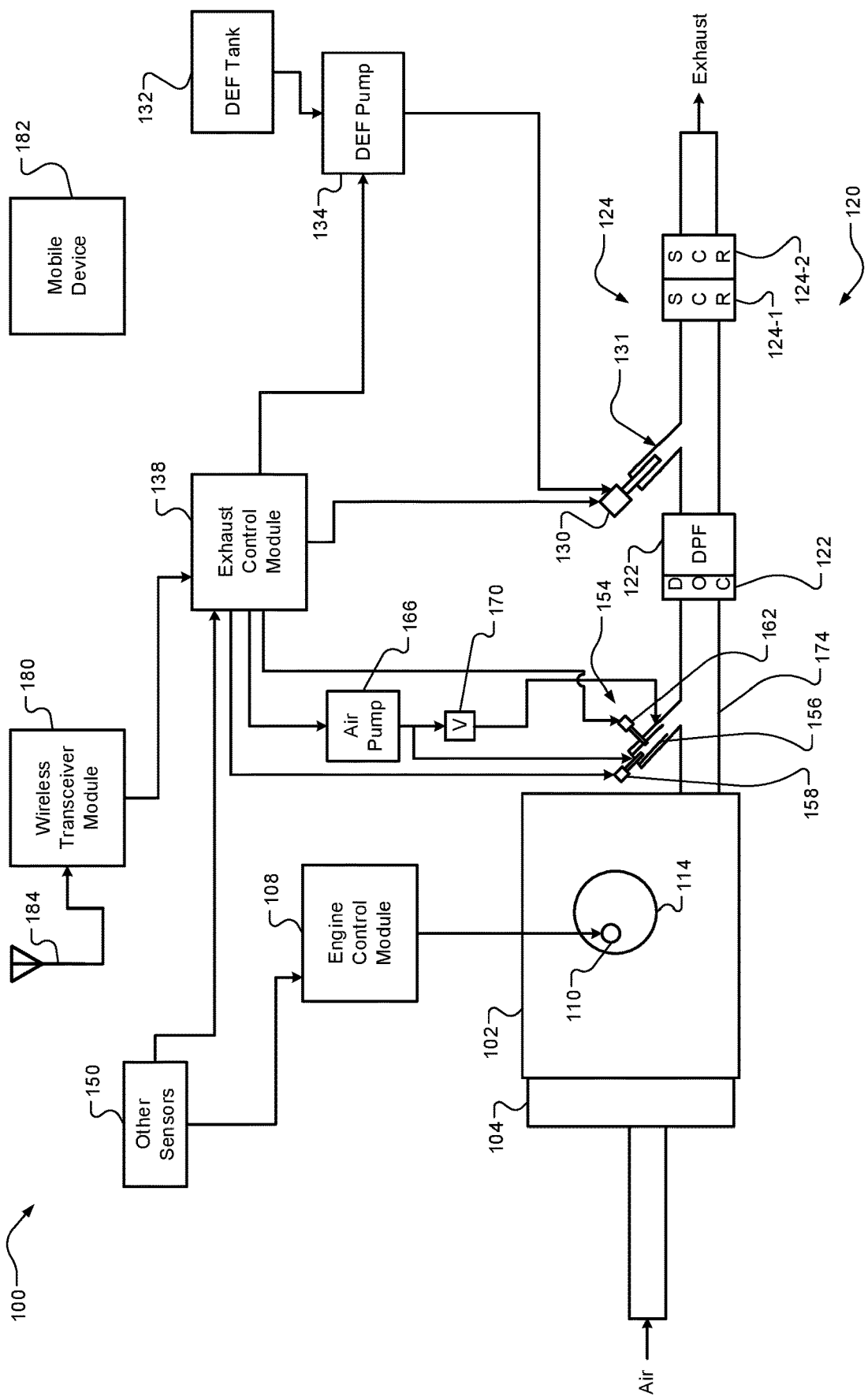
FIG. 1 is a functional block diagram of an example engine system.

A control module controls injection of a diesel exhaust fluid (DEF) into an exhaust system upstream of a selective catalytic reduction (SCR) catalyst. The SCR catalyst receives exhaust output by an engine of a vehicle. The exhaust includes nitrogen oxides (NOx). The DEF includes urea and water. Heat from the exhaust decomposes urea from the DEF into ammonia ($NH_3$). The SCR catalyst stores ammonia. Ammonia reacts with NOx in the exhaust thereby reducing the amount of NOx that is output from the SCR catalyst.

The engine may generate a high level of NOx at startup. The amount of ammonia stored on (by) the SCR at startup, however, may be low. The temperature of the exhaust at engine start up may be too low to enable DEF injected into a decomposition tube to be processed into ammonia. The NOx output of the vehicle may therefore be relatively high after engine startup.

The present application involves warming the SCR catalyst using a burner before engine startup, such as when a mobile wireless device (e.g., a key fob, a cellular phone, etc.) comes within a predetermined distance of the vehicle or using a time based system. The mobile device coming within the predetermined distance of the vehicle may indicate that engine startup will likely occur in the near future. An example of a time based system includes, for example, starting a timer when a driver exits the vehicle. If the driver typically leaves the vehicle for a predetermined period (e.g., for a break, meal, etc.) before returning, the burner could be turned on a predetermined warm up period before the predetermined period has passed.

Another example of a time based system includes tracking when the vehicle is typically started on various days (e.g., 7:30 am on Mondays through Fridays) and turning on the burner a predetermined period before that time. The burner combusts air and fuel to warm the SCR catalyst. Combustion may be initiated by a spark plug or another type of ignition device. The spark plug may also be used to sense whether a flame is present. The heating power of the burner may be a function of the fuel flow rate and extent to which the combustion reaction goes to completion. The combustion reaction will go to completion when a stoichiometric excess of air is provided relative to the fuel flow rate. This may be referred to as lean combustion.

Warming the SCR catalyst may decrease NOx output of the vehicle after engine startup by preparing the SCR catalyst to store ammonia for reaction with NOx sooner than if warming is not performed. For pre-heating the exhaust system, the exhaust burner may be operated under the conditions that provide lean combustion in order to minimize emissions. Maximum NOx emissions may be seen with near-stoichiometric combustion, while CO and unburned hydrocarbons are emitted in increasing amounts as the combustion becomes increasingly rich (a stoichiometric excess of fuel is provided to the burner). When operating the burner under lean conditions, the excess air flow also provides more gas molecules to carry the heat downstream to the emissions control devices.

If the temperature of the SCR catalyst becomes greater than a predetermined temperature where injected DEF can decompose into ammonia for storage by the SCR catalyst before the engine startup, DEF injection may be started. Beginning DEF injection before engine startup may decrease NOx output of the vehicle after engine startup.

During pre-heating with the burner, and air valve may be actuated to allow some of the air to not flow through combustion zone but instead be routed elsewhere. This serves several purposes, with the primary one being that more gas molecules will pass through the system in order to carry more heat downstream to the emissions control devices. In addition, the air-to-fuel ratio feeding into the burner combustion zone can be optimized for stable combustion and low emissions. In addition, the air by-passing the combustion zone can be directed to the annular space between the flame sheath and the outer shell of the burner component in order to maintain the temperature of the flame sheath (e.g., a thin-walled metal tube) to ensure its durability with respect to high temperature oxidation. Finally, the air can simply be passed into the exhaust pipe, where it will serve to maintain the temperature of the gas mixture entering the DOC (or first temperature-sensitive emissions control device) below the durability limit of that device.

Referring now to FIG. 1, a functional block diagram of an example engine system 100 is presented. An engine 102 generates propulsion torque for a vehicle. The vehicle may be have a class 4 rating, a class 5 rating, a class 6 rating, a class 7 rating, or a class 8 rating, such as from the United States Department of Transportation (DOT). Class ratings of vehicles are based on gross vehicle weight rating (GVWR). Generally speaking, GVWR increases as class rating increases and vice versa. While the engine 102 is shown and will be discussed as a diesel engine, the engine 102 may be another suitable type of engine. One or more electric motors (or motor-generators) may additionally generate propulsion torque.

Air is drawn into the engine 102 through an intake manifold 104. One or more fuel injectors, such as fuel injector 110, inject fuel that mixes air to form an air/fuel mixture. The air/fuel mixture is combusted within cylinders of the engine 102, such as cylinder 114. The fuel injector 110 inject fuel directly into the cylinder 114. Heat from compression within the cylinder 114 may initiate combustion within the cylinder 114. The ECM 108 controls fuel injection by the fuel injector 110. Although the engine 102 is depicted as including one cylinder, the engine 102 may include more than one cylinder. One fuel injector may be provided per cylinder.

Exhaust is expelled from the engine 102 to an exhaust system 120. The exhaust may include particulate matter (PM) and exhaust. The exhaust (gas) includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes a diesel oxidation catalyst (DOC) 122, a diesel particulate filter 126, and one or more selective catalytic reduction (SCR) catalysts, such as SCR catalyst 124-1 and SCR catalyst 124-2 (collectively "SCR catalyst 124"). The SCR catalyst 124-1 may, for example, include an iron zeolite or another suitable type of SCR catalyst. The SCR catalyst 124-2 may include a copper zeolite or another suitable type of SCR catalyst. In various implementations, the SCR catalysts 124-1 and 124-2 may be implemented within the same housing.

The exhaust flows from the engine 102 to the DOC 122. Exhaust output from the DOC 122 flows to the DPF 126. The DPF 126 filters particulate from the exhaust. In various implementations, the DPF 126 and the DOC 122 may be implemented within the same housing. The exhaust flows from the DPF 126 to the SCR catalyst 124.

A diesel exhaust fluid (DEF) injector 130 injects a DEF into the exhaust system 120 upstream of the SCR catalyst 124. For example, the DEF injector 130 may inject the DEF into a decomposition tube 131 where water in injected DEF evaporates and urea is decomposed and hydrolyzed into NH3. The decomposition tube 131 may also be referred to as a reactor. For example only, the decomposition tube 131 may be located between the DPF126 and the SCR catalyst 124. The DEF includes urea (e.g., $CO(NH_2)_2$) and water. The DEF is stored in a DEF tank 132 before injection. A DEF pump 134 draws DEF from the DEF tank 132 and pumps the DEF to the DEF injector 130.

An exhaust control module 138 controls actuation (e.g., opening and closing) the DEF injector 130 and therefore controls injection of DEF into the exhaust system 120. The exhaust control module 138 may also control operation of the DEF pump 134, such as to maintain a predetermined pressure of DEF input to the DEF injector 130.

When the engine is running, normal burner and DEF control may be used. When the engine is running, urea from DEF injected by the DEF injector 130 reacts with the hot exhaust to produce ammonia, and ammonia is supplied to the SCR catalyst 124. Heat evaporates the water in the DEF, and ammonia (NH3) is supplied to the SCR catalyst 124.

The SCR catalyst 124 stores (i.e., adsorbs) ammonia supplied by the DEF. The SCR catalyst 124 catalyzes a reaction between stored ammonia and NOx passing the SCR catalyst 124.

The amount of ammonia stored by the SCR catalyst 124 may be referred to as current storage. The current storage may be expressed as a mass of ammonia (e.g., grams), a number of moles of ammonia, or another suitable measure of the amount of ammonia stored by the SCR catalyst 124.

A percentage of NOx input to the SCR catalyst 124 that is removed from exhaust via reaction with ammonia may be referred to as NOx conversion efficiency. The NOx conversion efficiency is a function of the current storage of the SCR catalyst 124. For example only, the NOx conversion efficiency may increase as the current storage of the SCR catalyst 124 increases and vice versa.

The current storage of the SCR catalyst 124, however, is limited to a maximum amount of ammonia. This maximum amount of ammonia is referred to as a maximum storage capacity of the SCR catalyst 124. Maintaining the current storage of the SCR catalyst 124 near the maximum storage capacity ensures that a maximum possible amount of NOx is removed from the exhaust. In other words, maintaining the current storage near the maximum storage capacity may ensure that a greatest possible NOx conversion efficiency is achieved.

However, an inverse relationship exists between the maximum storage capacity and a temperature of the SCR catalyst 124. More specifically, the maximum storage capacity decreases as the SCR temperature increases during engine operation and vice versa.

The reaction of ammonia with NOx produces nitrogen and water. Other components of the exhaust, such as oxygen (02), may also be involved in the ammonia and NOx reaction.

One or more sensors may be implemented in the exhaust system 120, such as one or more NOx sensors, one or more temperature sensors, one or more oxygen sensors, and/or one or more other types of sensors. For example, a temperature sensor may measure a temperature of the SCR catalyst 124. In various implementations, the temperature of the SCR catalyst 124 may be estimated based on one or more exhaust temperatures. Other example types of sensors include a mass air flowrate (MAF) sensor, a recirculated exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors. Sensors are collectively illustrated by 150 in FIG. 1.

A burner 154 may also be connected to the exhaust system 120, such as upstream of the DOC 122 and the DPF 126. The burner 154 may include a fuel injector 158, a spark plug 162, and an air pump 166. While the example of the burner 154 including a spark plug is provided, the present application is also applicable to other types of igniters and ignition devices.

When on, the air pump 166 pumps air into the combustion chamber (within the flame sheath 156) and to the exhaust system 120. The fuel injector 158 injects fuel (e.g., diesel fuel) into the combustion chamber. The fuel mixes with the air from the air pump 166. The spark plug 162 generates spark within the combustion chamber. The spark ignites the air and fuel from the fuel injector 158 and the air pump 166. The flame sheath 156 is configured to shield a flame within the combustion chamber from being blown out, such as by exhaust from the engine 102 while the engine 102 is running.

The combustion of the air and fuel generates hot gas, which can be used to heat one or more components of the exhaust system 120 and/or for one or more other reasons. The exhaust control module 138 controls fuel injection by the fuel injector 158, spark generation by the spark plug 162, and operation of the air pump 166. In various implementations, the exhaust control module 138 may control a speed of the air pump 166, whether or not the burner 154 is receiving fuel for combustion. When receiving fuel, the exhaust control module 138 may control the speed of the air pump 166 to achieve the desired air-to-fuel ratio. If the burner 154 is operated while the engine is running, the exhaust control module 138 may operate the burner 154 over a full range of air-to-fuel ratios that enable stable combustion.

Figure 4A:
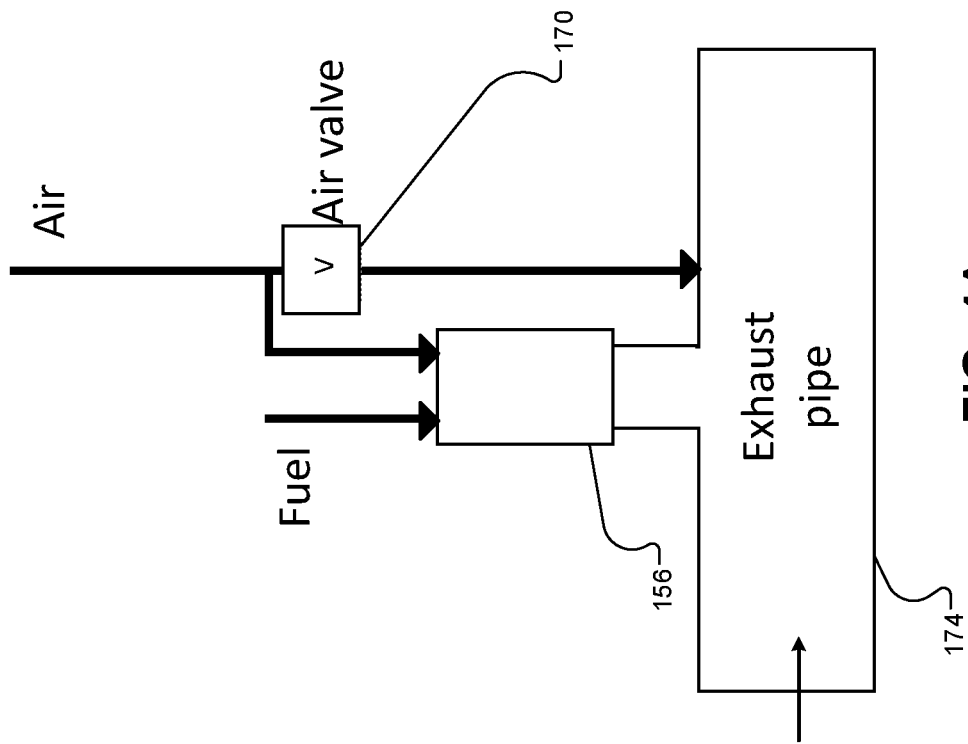
Figure 3:
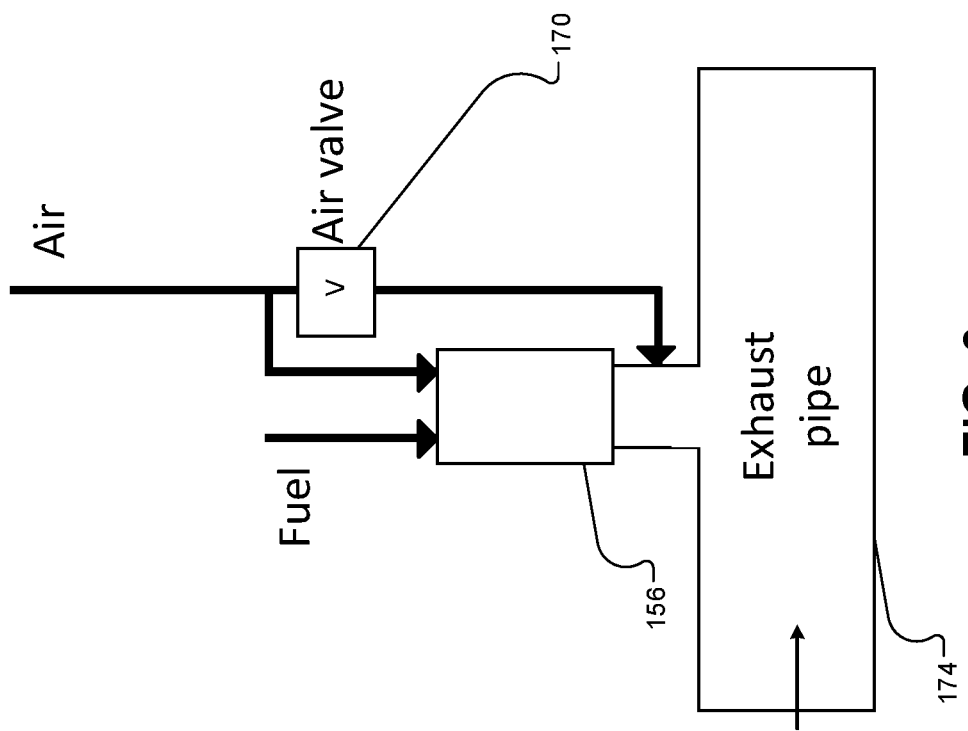

The air pump 166 also pumps air to an air valve (V) 170. The air valve 170 regulates airflow to a second location, such as around the flame sheath 156. Flowing air around the flame sheath 156 may cool the flame sheath 156 and increase a lifetime of the flame sheath 156. In various implementations, the second location may be between the flame sheath 156 and an exhaust pipe 174 that is connected to the burner 154, such as illustrated in FIG. 3. Alternatively, the air valve 170 may output air from the air pump 166 directly to the exhaust pipe 174, such as illustrated in FIG. 4A. Alternatively, the air valve 170 may output air from the air pump 166 to the exhaust pipe 174 upstream of the burner 156, such as illustrated in FIG. 4B. The exhaust control module 138 also controls actuation of the air valve 170.

An engine control module (ECM) 108 controls a torque output of the engine 102 while the engine 102 is running. The ECM 108 also controls starting and shutdown of the engine 102. The ECM 108 may start the engine 102, for example, in response to user actuation of one or more user input devices, such as an ignition button or switch of the vehicle and/or a combination of one or more user input devices of a key fob. The ECM 108 may shut down the engine 102, for example, in response to user actuation of the one or more user input devices (e.g., the ignition button or switch) of the vehicle and/or the one or more user input devices of the key fob.

As discussed above, the exhaust control module 138 may control injection of the DEF by the DEF injector 130. For example only, the exhaust control module 138 may control the timing and rate of DEF injection. By controlling DEF injection, the exhaust control module 138 controls the supply of ammonia to the SCR catalyst 124 and the current storage of the SCR catalyst 124.

The rate at which DEF is injected may be referred to as a DEF injection rate (e.g., grams per second). A rate at which ammonia is supplied to the SCR catalyst 124 may be referred to as an ammonia supply rate (e.g., grams per second). The exhaust control module 138 may determine a target supply rate for supplying ammonia to the SCR catalyst 124, determine a target DEF injection rate to achieve the target supply rate, and control the injection of DEF at the target DEF injection rate.

The vehicle may include a wireless transceiver module 180 configured to communicate wirelessly with mobile devices (e.g., key fobs, cellular phones, etc.), such as mobile device 182, using a communication protocol. The communication protocol may be a Bluetooth (BT) (defined by a section of IEEE 802.15) communication protocol, a WiFi (defined by a section of IEEE 802.11) communication protocol, or another suitable communication protocol. The wireless transceiver module 180 communicates wirelessly via one or more antennas, such as antenna 184.

The NOx emissions of the vehicle may be relatively high in response to engine startup. The present application involves warming the SCR catalyst 124 while the engine 102 is off before an engine startup, such as when a mobile device that communicates with the wireless transceiver module 180 transitions from being more than a predetermined distance of the vehicle to being less than the predetermined distance of the vehicle. Another indicator of an imminent engine startup may be, for example, unlocking of one or more door locks of the vehicle. In various implementations, the wireless transceiver module 180 may unlock one, more than one, or all of the door locks of the vehicle in response to receipt of user input to the mobile device. Another indicator of an imminent engine startup may be, for example, passage of a predetermined period after a driver exits the vehicle (e.g., for a break, meal, etc.). For example, if the driver typically exits the vehicle for 45 minutes, the engine startup may be deemed imminent 30 minutes after the driver exits the vehicle. Another example of an indicator of imminent engine startup includes when the present date and time being at one or more predetermined days and times. For example, if the engine is typically started on 7:30 am on Mondays through Fridays, engine startup may be deemed imminent a 7:15 am on Mondays through Fridays. The burner combusts air and fuel to warm the SCR catalyst before the engine 102 is started.

The wireless transceiver module 180 may determine the distance between a mobile device and the vehicle, for example, using triangulation and multiple antennas of the vehicle. For example, the wireless transceiver module 180 may determine the distance of the mobile device to one antenna based on a relative signal strength indicator (RSSI) of signals between the mobile device and that antenna. RSSI may increase as distance decreases and vice versa. While the example of RSSI is provided, another suitable signal strength indicator may be used. The wireless transceiver module 180 may determine the distance between the mobile device and the vehicle based on the locations of antennas and the distances between the mobile device and the antennas, such as using an equation or a lookup table.

Warming before engine startup is performed by operating the burner 154 before the engine startup. The exhaust control module 138 may control the burner 154 (fueling via the fuel injector 158 and/or air from the air pump 166). During the warming, the air valve 170 may be partially or completely open such that air flows through the air valve 170 to the second location. This provides more gas to drive heat further downstream. While the engine 102 is running after startup, the exhaust control module 138 may close the air valve 170 such that no air flows from the air pump 166 to the second location. Once the engine 102 is running, the exhaust from the engine 102 will have a greater flow rate than that of the air pump for the burner 156, so the air valve 170 will be closed, and also the air flow rate of the burner 154 will be decreased so that the air-to-fuel ratio entering the combustion zone of the burner 154 will be within a target range for stable combustion, lean or rich, depending on the application.

The SCR catalyst 124 is cold when the warming begins. The burner 154 is operated first to heat up the substrates of the exhaust system. Once the substrates are hot and heat is also reaching the decomposition tube, then dosing may be initiated and performed. However, if the pre-heating period is relatively long and the burner 154 continues to operate (in order to warm up the entire exhaust system), the DEF dosing may be stopped because the NH3 capacity of the SCR is decreasing as the temperature increases.

Figure 2:
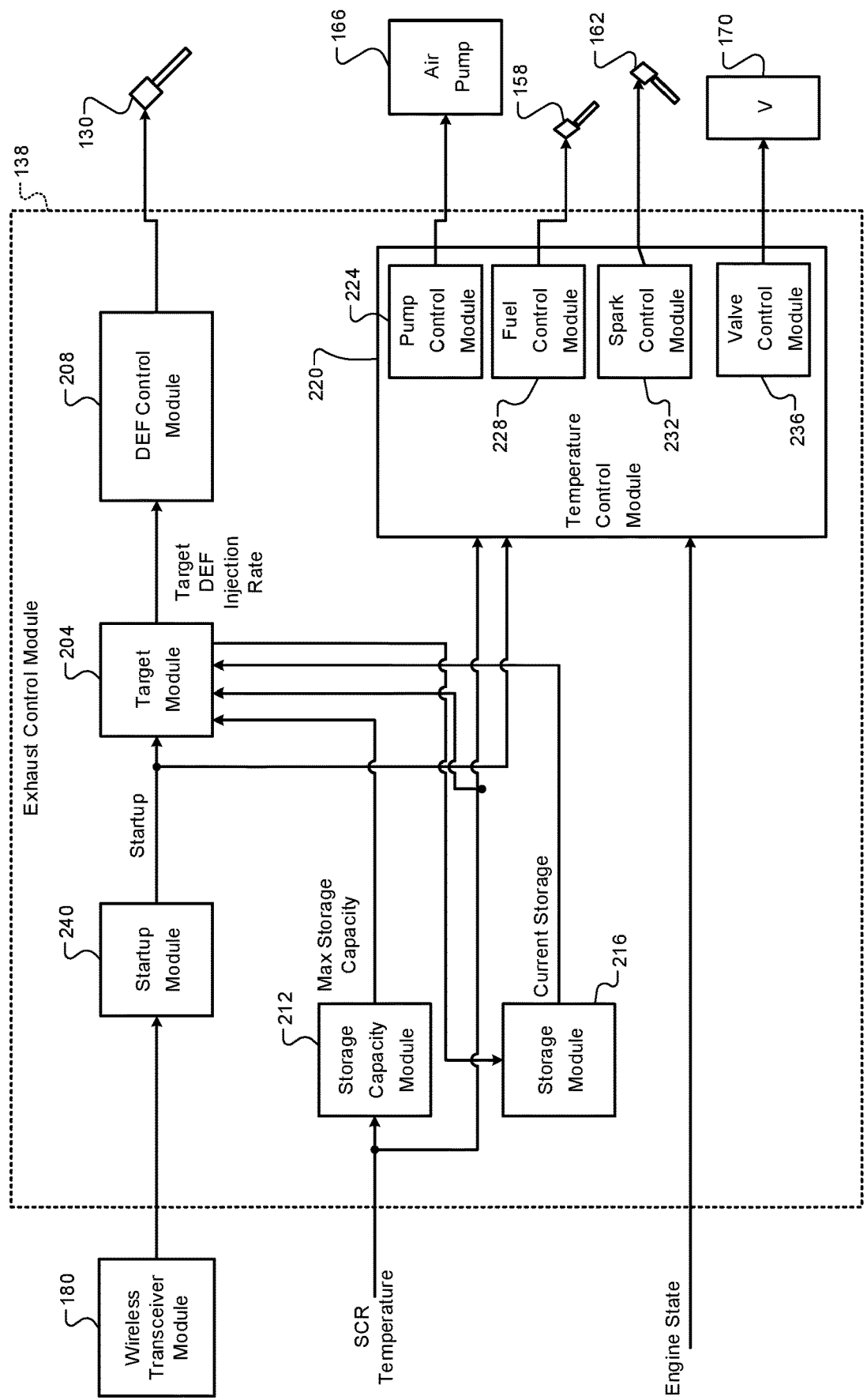
FIG. 2 is a functional block diagram of an example exhaust control system.

FIG. 2 is a functional block diagram of an example exhaust control system. A target module 204 determines a target DEF dosing rate, for example, based on a target (ammonia) supply rate to the SCR catalyst 124. The target module 204 may determine the target DEF injection rate using one of a lookup table and an equation that relates target supply rates to target DEF injection rates. The target DEF injection rate corresponds to an injection rate of the DEF to achieve the target supply rate of ammonia to the SCR catalyst 124. The target supply rate corresponds to a target rate to supply ammonia to the SCR catalyst 124.

A DEF control module 208 controls opening and closing of the DEF injector 130 to control injection and to achieve the target DEF injection rate. The DEF control module 208 may open the DEF injector 130 by applying power (e.g., from a battery) to the DEF injector 130. The DEF control module 208 may close the DEF injector 130 by disconnecting the DEF injector 130 from power. The DEF control module 208 may control the DEF injector 130 using pulse width modulation (PWM) control or another suitable type of control.

The target module 204 may determine the target supply rate, for example, based on a target current storage for the SCR catalyst 124, a current storage of the SCR catalyst 124, and/or one or more other parameters. The target module 204 may determine the target supply rate, for example, using one of an equation and a lookup table that relates target current storage, current storage and the other parameter(s) to target supply rates.

While the engine is running, the target module 204 may determine the target current storage, for example, based on a predetermined percentage of a present maximum storage capacity of the SCR catalyst 124. The predetermined percentage may be, for example, 90 percent, 95 percent, or another suitable value less than or equal to 100 percent and greater than or equal to 50 percent. A predetermined percentage of 100 percent may increase a likelihood of ammonia slip, for example, in response to an increase in temperature, which causes a decrease in the maximum storage capacity and may cause ammonia to desorb from the SCR catalyst 124.

A storage capacity module 212 may determine the present maximum storage capacity based on a present temperature of the SCR catalyst 124. For example, the storage capacity module 212 may increase the present maximum storage capacity as the temperature decreases and vice versa. The storage capacity module 212 may determine the present maximum storage capacity using one of a lookup table and an equation that relates temperatures of the SCR catalyst 124 to maximum storage capacities.

When the engine 102 is off before an engine startup, the target module 204 may set the target storage to a percentage of a maximum storage capacity of the SCR catalyst 124 at a specified temperature. For example, the target module 204 may set the target current storage to 100 percent of the maximum storage capacity of the SCR catalyst 124 at 150 degrees Celsius. While these examples are provided, other percentages, temperatures, and target current storages values may be used. Copper-zeolite SCR catalysts may have storage levels approximately 3 grams/Liter of substrate volume.

A storage module 216 may determine the present (ammonia) storage of the SCR catalyst 124. While the engine 102 is off in response to an engine shutdown, the engine 102 is not outputting NOx. However, the present storage of the SCR catalyst 124 at engine shutdown will be known as the storage module 216 tracks the current storage while the engine 102 is on. The present storage increases while DEF injection is performed while the engine 102 is off.

The storage module 216 may receive a present ammonia supply rate (e.g., grams per second). For example, the storage module 216 may receive the target supply rate from the target module 204. The storage module 216 may (mathematically) integrate the ammonia supply rate each predetermined period to determine masses of ammonia supplied to the SCR catalyst 124. The storage module 216 may add each mass of ammonia to the (then) current storage to update the current storage over time as DEF injection is performed.

A temperature control module 220 controls operation of the air pump 166, the air valve 170, the fuel injector 158, and the spark plug 162. More specifically, a pump control module 224 controls operation of the air pump 166, and a fuel control module 228 controls operation of the fuel injector 158. A spark control module 232 controls the spark plug 162, and a valve control module 236 controls actuation of the air valve 170.

The ECM 108 controls engine startup, as described above. Before the ECM 108 starts the engine 102, a startup module 240 may selectively generate a startup signal indicative of an upcoming engine startup. For example, the startup module 240 may generate the startup signal when the mobile device is within the predetermined distance (e.g., 20 feet) of the vehicle. The wireless transceiver module 180 may determine the distance between the mobile device and the vehicle, such as discussed above. Additionally or alternatively, the startup module 240 may generate the startup signal in response to unlocking of one or more doors of the vehicle. Additionally or alternatively, the startup module 240 may generate the startup signal based on a present time, such as when the present time reaches a predetermined time when engine startup commonly (e.g., daily, such as on weekdays) occurs.

When the startup signal is generated, the pump control module 224 turns on the air pump 166. Additionally, the fuel control module 228 begins fuel injection via the fuel injector 158, and the spark control module 232 begins providing spark to ignite the air and fuel. Additionally, the valve control module 236 opens the air valve 170 to a predetermined open position such that some air from the air pump 166 flows to the second location, such as around the flame sheath 156. The predetermined open position may be partially or completely open. To provide a predetermined fuel lean air/fuel mixture relative to a stoichiometric air/fuel mixture when the startup signal is generated, at least one of (a) the fuel control module 228 may control (e.g., decrease) fueling and (b) the valve control module 236 may open the air valve 170. Providing a fuel lean air/fuel mixture may, for example, maximize warming of the SCR catalyst 124 before the engine startup.

An engine state signal indicates whether the engine 102 is running (on), starting (startup), or shut down (off). The ECM 108 may set the engine state signal and output the engine state signal to other modules.

Before the engine startup (when the startup signal is generated but before the engine startup has been initiated by the ECM 108), the DEF control module 208 may begin DEF injection when the temperature of the SCR catalyst 124 is greater than the predetermined temperature. As described above, injected DEF can decompose into ammonia for storage by the SCR catalyst 124 when the temperature is greater than the predetermined temperature. For example, the target module 204 may set the target supply rate as described above to adjust the current storage of the SCR catalyst 124 toward or to the maximum storage capacity or the predetermined percentage of the maximum storage capacity before the engine startup.

When the engine state indicates that the engine 102 is running, such as after the engine startup, the valve control module 236 may close the air valve 170 to a fully closed position such that all of the air output from the air pump 166 flows to within the flame sheath 156. Normal control of the burner 154 and DEF injection may be performed.

Regarding setting the target DEF injection rate, the target module 204 may first determine an amount of NH3 to be input to reach the target current storage based on a difference between the present storage and the target current storage. Second, based on the amount of NH3 to be input, the target module 204 may determine an amount of DEF to inject into the decomposition tube 131 to provide the amount of NH3. The target module 204 may set the target injection rate (e.g., over time) based on various factors, such as the SCR temperature or the temperature of the air exiting the DOC and DPF after the air pump 166 is on. For example, DEF injection may be disabled if the SCR temperature is too high or the temperature of the gas exiting the DPF 126 is too low. The SCR temperature may be determined, for example, based on an average of exhaust temperatures into and out of the SCR catalyst 124. The exhaust temperature sensors operate based on flowing gas, so the air pump 166 may be operated and DEF injection may be disabled for a period while the exhaust temperature sensors become ready.

When the temperature of the SCR catalyst 124 is less than the predetermined temperature, the target module 204 may determine an enthalpy rate of the (hot) air coming from the DPF 126 and entering the decomposition tube 131. The enthalpy rate may need to be greater by a factor of X than an enthalpy consumption rate corresponding to a maximum DEF dosing rate allowed. Processing of DEF within the decomposition tube 131 is endothermic, as each step in the process is endothermic, such as raising the temperature of the water from 25 degrees C. to 100 degrees C., evaporating the water, subliming solid urea into gaseous urea, and decomposing urea into NH3 and HNCO, etc. Therefore, a DEF dosing rate may have a DEF enthalpy consumption rate associated with it.

The difference between the enthalpy rate of the hot air flow created by the air pump and the factor X may define a maximum enthalpy consumption rate and thus the corresponding maximum DEF dosing rate. The target module 204 may then set the target DEF injection rate to cause dosing at the maximum enthalpy consumption rate.

The factor (value) X may be calibrated based on one or more characteristics of the decomposition tube 131. When the DEF is injected into the decomposition tube 131, the droplets may impinge on surfaces. These surfaces are heated by the hot gas flow and cooled by the impinging droplets. If a wall film forms on the surface of the decomposition tube 131, the temperature will decrease, for example, due to the evaporation of the water in the DEF droplets. The target module 204 may limit the target DEF injection rate so that the enthalpy rate of the air is sufficient to keep the surface of the decomposition tube 131 hot and to prevent wall film formation.

If the present storage reaches the target storage before engine startup, DEF injection and the air pump 166 may be disabled. If the burner 154 has been operating (providing heat), it too is disabled.

Figure 5:
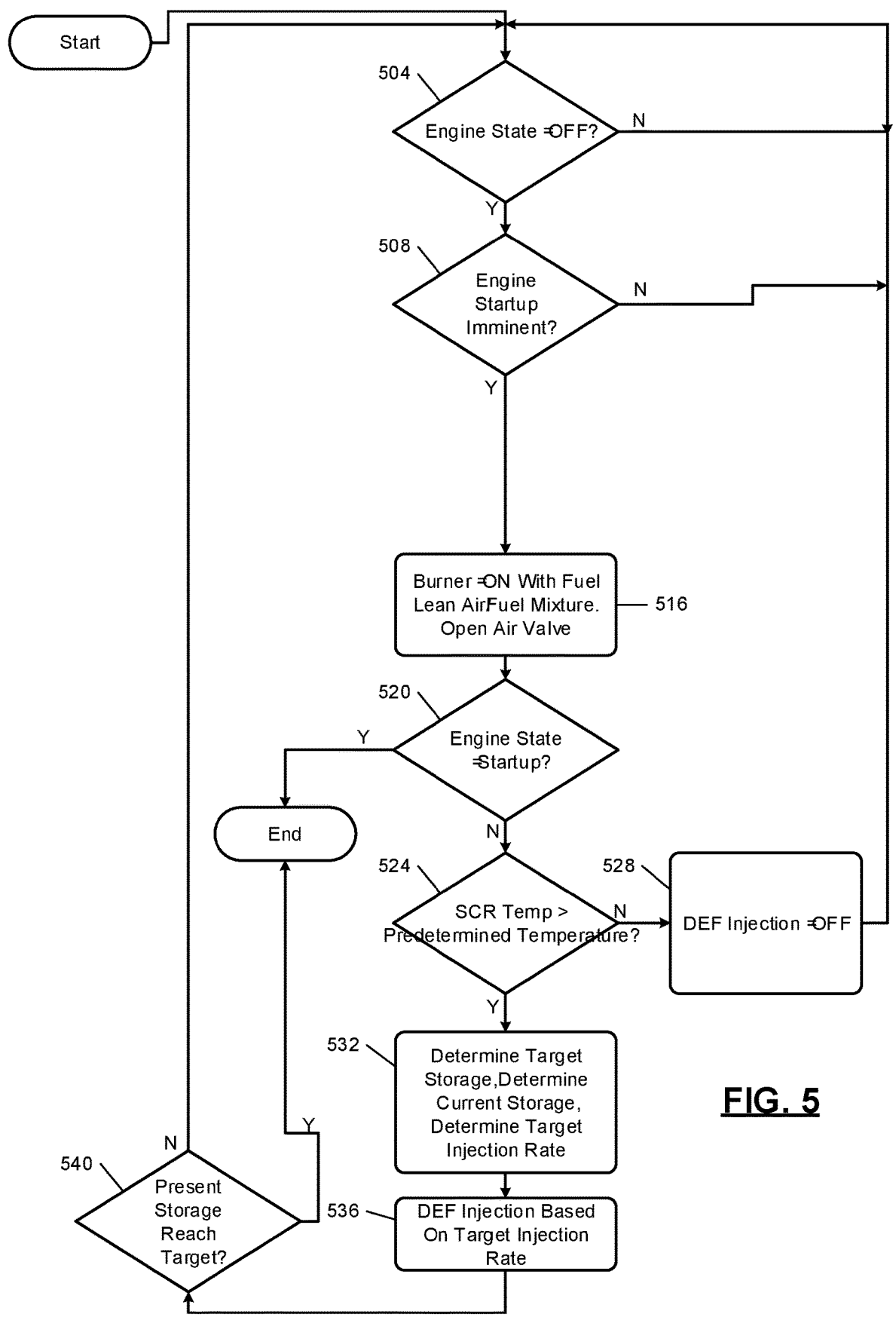
FIG. 5 is a flowchart depicting an example method of controlling DEF injection, heating, and airflow before engine startup.

FIG. 5 is a flowchart depicting an example method of controlling DEF injection, heating, and airflow before an engine startup. Control begins with 504 where the target module 204 and the temperature control module 220 determine whether the engine 102 is off, such as whether the engine state signal indicates that the engine 102 is off. If 504 is true, control continues with 508. If 504 is false, control may remain at 504.

At 508, the startup module 240 determines whether engine startup is imminent, as described above. If 508 is true, control continues with 516. If 508 is false, control may return to 504 or remain at 508. Example indicators of imminent engine startup include, for example, when the wireless transceiver module 180 determines that a mobile device associated with the vehicle is within the predetermined distance of the vehicle. Additionally or alternatively to the mobile device being within the predetermined distance of the vehicle, the present application is also applicable to other predictors of engine startup, such as unlocking of door locks of the vehicle, a present time being within a predetermined period of a time when the vehicle is usually started, the present day and time being one of one or more predetermined days and times, etc.

At 516, the temperature control module 220 turns or maintains the burner 154 on. More specifically, the pump control module 224 turns or maintains on the air pump 166. The fuel control module 228 turns or maintains on fueling via the fuel injector 158. The spark control module 232 turns or maintains on spark from the spark plug 162. The valve control module 236 also opens the valve 170 to flow air to the second location at 516. To provide fuel lean air/fuel mixture to the burner 154, at least one of the fuel control module 228 and the valve control module 236 adjusts fueling and/or air valve opening, respectively.

At 520, the temperature control module 220 and the target module 204 determine whether the engine state is set to the engine startup state. The ECM 108 is starting (cranking) the engine 102 when the engine state is set to the engine startup state. If 520 is true, control may end. If 520 is false, control may continue with 524.

At 524, the target module 204 may determine whether the temperature of the SCR catalyst 124 is greater than the predetermined temperature. If 524 is true, control may continue with 532. If 524 is false, the target module 204 may set the target DEF injection rate to zero and DEF injection may be disabled at 528, and control may return to 504.

At 532, the target module 204 determines the target storage (e.g., sets the target storage to a predetermined storage for engine startup), and the storage module 216 updates the current storage of the SCR catalyst 124. The storage module 216 may update the current storage by integrating the (present) target supply rate to determine a mass of ammonia supplied to the SCR catalyst and adding the determined mass to the current storage. The target module 204 determines the target supply rate and the target DEF injection rate, as discussed above. At 536, the DEF control module 208 controls the DEF injector 130 to inject DEF based on or at the target DEF injection rate.

At 540, the temperature control module 220 and the target module 204 determine whether current storage has reached (e.g., is greater than or equal to) the target storage. If 540 is true, DEF injection and the burner 154 may be disabled, and control may end. IF 540 is false, control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust control system of a vehicle, comprising:
   a fuel injector configured to inject fuel into a combustion chamber of a burner of an exhaust system upstream of a selective catalytic reduction (SCR) catalyst;
   an air pump configured to pump air into the combustion chamber of the burner via an air supply line;
   a spark plug configured to ignite an air/fuel mixture within the combustion chamber of the burner;
   a fuel control module configured to, while an engine is off before an engine startup, selectively actuate the fuel injector and begin fuel injection;
   a pump control module configured to, while the engine is off before the engine startup, selectively turn on the air pump;
   a spark control module configured to, while the engine is off and before the engine startup, selectively apply power to the spark plug and begin providing spark; and
   an air valve that receives air from the air pump via the air supply line, wherein a valve control module is configured to control the air valve, when open, to output air to a second location that is different than the combustion chamber of the burner while the engine is off before the engine startup, wherein the air supply line includes a branch positioned upstream of the air valve.

2. The exhaust control system of claim 1 further comprising a startup module configured to selectively generate an engine startup signal before the engine startup,
   wherein:
   the fuel control module is configured to, while the engine is off before the engine startup, actuate the fuel injector and begin fuel injection in response to the generation of the engine startup signal;
   the pump control module is configured to, while the engine is off before the engine startup, turn on the air pump in response to the generation of the engine startup signal; and
   the spark control module configured to, while the engine is off and before the engine startup, apply power to the spark plug and begin providing spark in response to the generation of the engine startup signal.

3. The exhaust control system of claim 2 wherein the startup module is configured to generate the engine startup signal in response to a determination that a distance between a mobile device and the vehicle transitioned from (a) greater than a predetermined distance to (b) less than the predetermined distance.

4. The exhaust control system of claim 3 further comprising a wireless transceiver module configured to:
   wirelessly communicate with the mobile device; and
   determine the distance between the mobile device and the vehicle based on signals received from the mobile device.

5. The exhaust control system of claim 2 wherein the startup module is configured to generate the engine startup signal in response to unlocking of one or more doors of the vehicle.

6. The exhaust control system of claim 3 wherein the mobile device is a key fob.

7. The exhaust control system of claim 2 wherein the startup module is configured to selectively generate the engine startup signal based on a present time.

8. The exhaust control system of claim 2 wherein the startup module is configured to generate the engine startup signal in response to a determination that a predetermined period passed after a user exited the vehicle.

9. The exhaust control system of claim 1 further comprising:
   a diesel emissions fluid (DEF) injector configured to inject a DEF into the exhaust system upstream of the selective catalytic reduction (SCR) catalyst; and
   a DEF control module configured to, while the engine is off before the engine startup, selectively actuate the DEF injector and begin DEF injection.

10. The exhaust control system of claim 9 wherein the DEF control module is configured to, while the engine is off before the engine startup, selectively actuate the DEF injector and begin DEF injection in response to a determination that a temperature of the SCR catalyst is greater than a predetermined temperature.

11. The exhaust control system of claim 10 wherein the DEF control module is configured to, while the engine is off before the engine startup, not actuate the DEF injector and not perform DEF injection when the temperature of the SCR catalyst is less than the predetermined temperature.

12. The exhaust control system of claim 1 further comprising a flame sheath including:
   an inner surface that defines the combustion chamber; and
   an outer surface,
   wherein the second location is adjacent to the outer surface of the flame sheath.

13. The exhaust control system of claim 1 wherein the second location is downstream of the combustion chamber.

14. An exhaust control method for a vehicle, comprising:
   by a fuel injector, selectively injecting fuel into a combustion chamber of a burner of an exhaust system upstream of a selective catalytic reduction (SCR) catalyst;
   by an air pump, selectively pumping air into the combustion chamber of the burner;
   by a spark plug, selectively igniting an air/fuel mixture within the combustion chamber of the burner;
   by a valve, selectively receiving air from the air pump and, when open, outputting air to a second location different than the combustion chamber of the burner;

while an engine is off before an engine startup:
- actuating the fuel injector and beginning fuel injection;
- turning on the air pump;
- applying power to the spark plug and beginning to provide spark; and
- at least partially opening the valve to pump air to the second location.

15. The exhaust control method of claim 14 further comprising a selectively generating an engine startup signal before the engine startup,
wherein:
- the actuating the fuel injector and beginning fuel injection includes actuating the fuel injector and beginning fuel injection in response to the generation of the engine startup signal;
- the turning on the air pump includes turning on the air pump in response to the generation of the engine startup signal; and
- the applying power to the spark plug and beginning to provide spark includes applying power to the spark plug and beginning to provide spark in response to the generation of the engine startup signal.

16. The exhaust control method of claim 15 wherein the selectively generating the engine startup signal before the engine startup includes generating the engine startup signal in response to a determination that a distance between a mobile device and the vehicle transitioned from (a) greater than a predetermined distance to (b) less than the predetermined distance.

17. The exhaust control method of claim 16 further comprising:
- wirelessly communicating with the mobile device; and
- determining the distance between the mobile device and the vehicle based on signals received from the mobile device.

18. The exhaust control method of claim 15 wherein the selectively generating the engine startup signal before the engine startup includes generating the engine startup signal in response to unlocking of one or more doors of the vehicle.

19. The exhaust control method of claim 15 wherein the selectively generating the engine startup signal before the engine startup includes generating the engine startup signal at least one of:
- based on a present time; and
- in response to a determination that a predetermined period passed after a user exited the vehicle.

* * * * *